June 12, 1962 YAO T. LI 3,038,334
MASS FLOWMETER
Filed April 6, 1959 2 Sheets-Sheet 1

INVENTOR.
Yao Tzu Li
BY KENWAY, JENNEY, WITTER & HILDRETH
ATTORNEYS

June 12, 1962  YAO T. LI  3,038,334
MASS FLOWMETER
Filed April 6, 1959  2 Sheets-Sheet 2
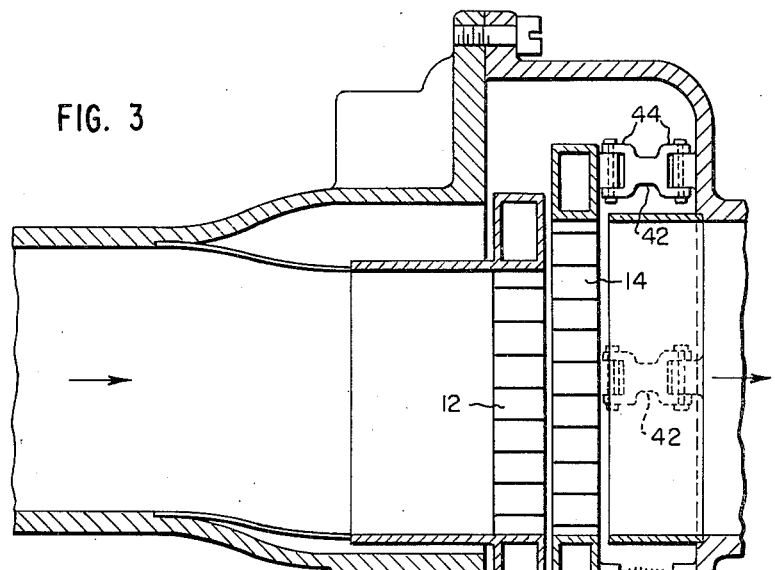
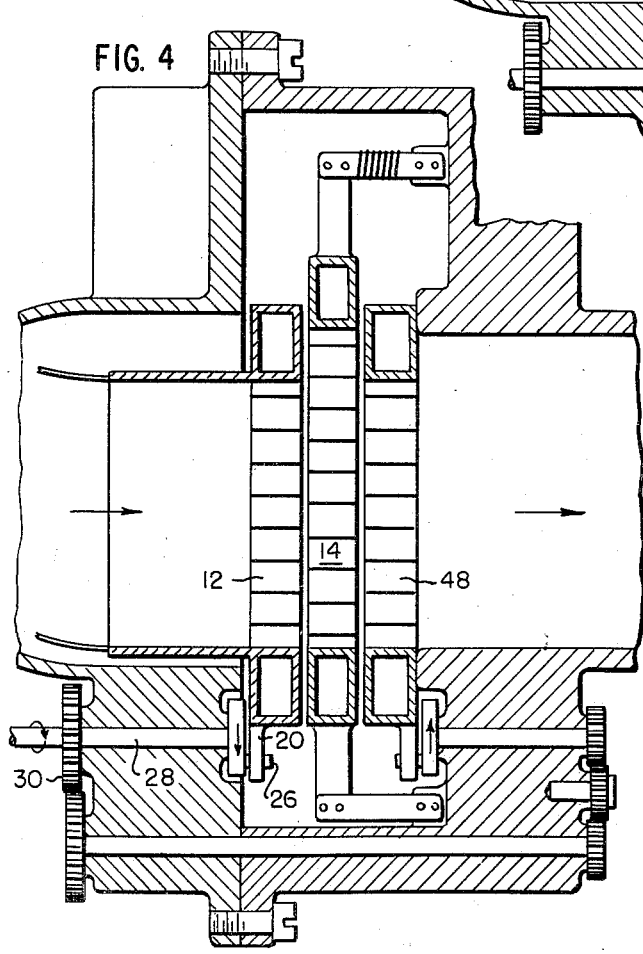
INVENTOR.
Yao Tzu Li
BY KENWAY, JENNEY, WITTER & HILDRETH
ATTORNEYS United States Patent Office 3,038,334
Patented June 12, 1962

3,038,334
MASS FLOWMETER
Yao T. Li, South Lincoln, Mass.
(28 Carleton St., Cambridge 42, Mass.)
Filed Apr. 6, 1959, Ser. No. 804,252
6 Claims. (Cl. 73—194)

The present invention relates to mass flowmeters, and more particularly to flowmeters which measure the true mass rate of flow without the necessity of calibration for the density of the particular fluid flowing therethrough.

Various forms of so-called true mass flowmeters have been proposed, operating on the principle of measuring the rate of change of angular momentum, but all of these devices require, for one reason or another, a rotating member having a radius considerably larger than the radius of the stationary conduit. Moreover, in some of these devices the rotating member does not have well defined radii, and the rate of change of the angular momentum of the fluid depends on the radial distribution of the fluid in the rotating member, and it is to minimize this effect that the rotating member is made large, but an error is nevertheless introduced if the flow pattern changes.

The principal object of the present invention is to provide a true mass flowmeter which does not require a substantial increase of size above the size of the conduit. With this and other objects in view the present invention comprises the flowmeter hereinafter described and particularly defined in the claims.

In the accompanying drawings FIGURE 1 is a sectional elevation of a conduit with a flowmeter according to the invention.

FIG. 3 is a view of a modified mounting, and

FIG. 4 is a view of a modified construction to compensate for viscous shear forces.

Figure 1:
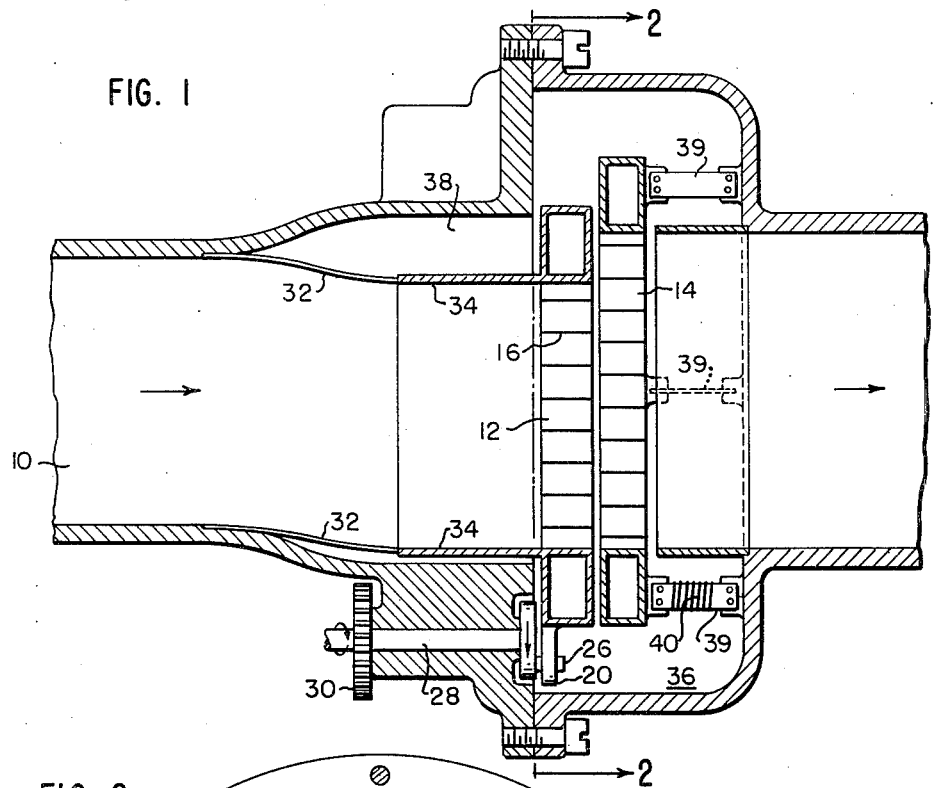
Figure 2:
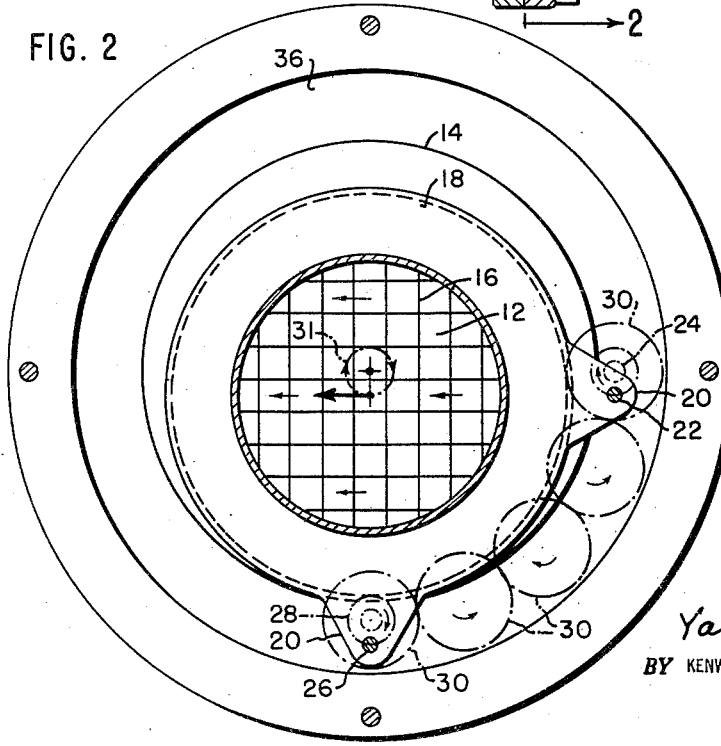
FIG. 2 is a face view of the drive member, taken on line 2—8 of FIG. 1.

As shown in FIGS. 1 and 2, the stationary conduit 10, carrying the fluid whose mass flow is to be measured, is provided internally with a lateral momentum drive member 12 and a lateral momentum receiving member 14. Each of these members is in the form of a grid or "honeycomb" to define a large number of axial passages. Each passage preferably has an axial dimension somewhat larger than any lateral dimension. The passages are formed by partitions 16 which are as thin as possible consistent with structural strength.

The drive member 12 is mounted for lateral motions, either as (a) a simple oscillatory motion, or (b) a compound oscillatory motion in two coordinates, whereby any point in the grid describes a circular or elliptical path without any rotary motion of the grid as a whole. The preferred operation is the second one mentioned above, and the invention will now be described for that embodiment.

The means by which the desired motion is imparted to the member 12 may take any suitable form. A simple arrangement shown in FIG. 2, comprises a ring 18 within which the grid 12 is mounted, and having two ears 20 spaced 90° apart around the the ring. A crank 22 is connected to a drive shaft 24 and to one of the ears 20, while the other ear is connected by a crank 26 to a shaft 28. The two shafts are driven together through a series of idler gears 30. By this means each point of the grid describes a circular orbit of a radius equal to the length of the crank, and in a plane transverse to the axis of the conduit.

Each point of the grid moves in a circular orbit; the orbit of the central point of the grid is indicated by the circle 31 shown in broken lines in FIG. 2. Each particle of fluid passing through the grid has imparted to it a lateral component of velocity which at any instant is equal in magnitude and direction to the lateral velocity of the grid; in other words, the vector representing the instantaneous lateral velocity is tangent to the orbital circle, as shown in FIG. 2. The motion of the grid introduces no change of angular momentum into the fluid, but the fluid possesses a change of linear momentum as it leaves the drive member 12. The rate of change of linear momentum imparted by the grid can be shown to be the product of the total mass rate of flow and the instantaneous lateral velocity of the grid.

The member 12 is suitably mounted to permit the limited lateral motions above described, as for example by the use of flexible guides or arms 32 attached internally of the conduit and connected to an inlet sleeve 34 which in turn is connected to the ring 18. The sleeve 34 is preferably of the same diameter as the conduit 10. The conduit is provided with an enlarged annular portion 36 to accommodate the outer part of the member 12. A smaller enlargement 38 leads from the conduit itself to the portion 36 in order to accommodate the motions of the sleeve 34 and supports 32.

The receiving member 14 which may also be termed the measuring member, is of substantially the same construction as the member 12 and is mounted immediately adjacent to the member 12 on the downstream side thereof. The member 14 absorbs the lateral fluid momentum and is therefore subjected to an instantaneous force equal to the mass flow rate times the lateral velocity of the fluid. The member 14 is flexibly mounted in the conduit.

The receiving or measuring member 14 may be mounted to operate in one of several different ways.

The preferred mounting for the measuring member is to constrain it against any motion transverse to the conduit. Then the orbital motions of the grids of the member 12 cause the instantaneous angular momenta of the fluid to apply a torque to turn the grid 14 about a longitudinal axis. As shown in FIG. 1 this mounting is most simply made by the use of a series of flat springs or flexure plates, 39 preferably at least four, uniformly distributed about the periphery and attached between the outer ring of the member 14 and an end wall of the enlarged conduit. The plates 39 are sufficiently stiff to support the member 14 in the conduit while permitting it to turn slightly about the central axis of the conduit. The amount of the motion may be measured in any suiable manner, conveniently by a strain gage winding 40 about one of the plates 39 and sensitive to bending thereof.

The measurement obtained by the above-described mounting is a uniform or 'direct current" reading since the torque on the member 14 is constant so long as the flow is uniform, except for a possible small oscillatory torque if the center of the orbital motions of the member 12 does not coincide with the center of the member 14. Any such oscillatory response may be filtered out, preferably by electrical means well known to those skilled in the art, and hence the instantaneous output of the strain gage transducer is a measure of the mass rate.

Another mounting means permits lateral motion of member 14 in one dimension. This is readily accomplished by mounting the receiving grid member on struts 42 (FIG. 3) provided with stirrups 44 arranged in the manner shown, so that vertical motion is prevented and back-and-forth motion perpendicular to the paper, as viewed in the drawing, is permitted. A flat spring member 46 having a strain gage winding is provided to give an output. The output of the strain gage is an alternating current since under uniform flow the grid 14 is oscillated at a frequency equal to the rotational speed of the drive member 12. Under variable flow conditions the alternating output is modulated in accordance with the variations in flow.

In the construction of FIG. 3, it is not necessary to operate the grid 12 in an orbital motion, since it may be oscillated in a single lateral degree of freedom, along a lateral axis parallel to the axis of the motion of the member 14.

In FIG. 4 is shown a device for viscous shear compensation. There is a constant shear force between the drive member and the measuring member, and with fluids of high viscosity this may introduce an error. To avoid the error a screen 48 is mounted on the downstream side of the measuring grid 14. This is driven from the drive member 12 and in the same manner as the member 12 but in the reverse direction. This is most conveniently accomplished by providing the screen with ears similar to the ears 20 of the drive member. By the use of cranks identical to those shown at 26 and 28 in FIG. 1 but driven in the opposite directions, the desired motion of the screen can be obtained. The screen is preferably of identical construction to the grid 12, but it is also possible to use a screen of thinner construction with openings of smaller size, and in either case it is possible to apply to the member 14 viscous shear forces which are of substantially the same magnitude as those applied by the member 12, but in the opposite direction, so that substantially complete compensation is obtained for all fluids at any temperature.

Having thus described the invention, I claim:

1. A mass rate flowmeter comprising a conduit, a drive member having a plurality of passages disposed longitudinally of the conduit, means for mounting the drive member in the conduit and for imparting to it a non-rotational translatory motion across the conduit and in a plane substantially normal to the general direction of flow through the conduit, whereby the fluid is given a transverse momentum, a measuring member having a plurality of passages disposed longitudinally of the conduit, said measuring member being disposed downstream and closely adjacent to the drive member, means for mounting the measuring member for displacement transversely of the conduit, and means for measuring the instantaneous displacements of the measuring member as a measure of mass flow.

2. Apparatus according to claim 1 including viscous shear compensating means comprising a member of construction similar to the drive member mounted on the downstream side and in proximity to the measuring device, and means for imparting to the compensating means a motion similar to, but opposite in direction to, the motion of the drive member.

3. A mass rate flowmeter comprising a conduit, a drive member having a plurality of passages disposed longitudinally of the conduit, means for mounting the drive member in the conduit and for imparting to it a non-rotational compound translatory motion so that each point undergoes an orbital motion in a plane substantially normal to the general direction of flow through the conduit, a measuring member having a plurality of passages disposed longitudinally of the conduit, said measuring member being disposed downstream and closely adjacent to the drive member, means for mounting the measuring member for limited rotation in the conduit without transverse motion, and a device for measuring the torques applied to the measuring member by the transverse momenta of the fluid as a measure of mass flow.

4. Apparatus according to claim 3 including viscous shear compensating means comprising a member of construction similar to the drive member mounted on the downstream side and in proximity to the measuring device, and means for imparting to the compensating means a motion similar to, but opposite in direction to, the motion of the drive member.

5. A mass rate flowmeter comprising a conduit, a drive member having a plurality of passages disposed longitudinally of the conduit, means for mounting the drive member in the conduit and for imparting to it a non-rotational compound translatory motion so that each point undergoes an orbital motion in a plane substantially normal to the general direction of flow through the conduit, a measuring member having a plurality of passages disposed longitudinally of the conduit, said measuring member being disposed downstream and closely adjacent to the drive member, means for mounting the measuring member for transverse motion in one dimension, and means for measuring transverse displacements of the measuring member under the instantaneous transverse momenta of the fluid as a measure of mass flow.

6. Apparatus according to claim 5 including viscous shear compensating means comprising a member of construction similar to the drive member mounted on the downstream side and in proximity to the measuring device, and means for imparting to the compensating means a motion similar to, but opposite in direction to, the motion of the drive member.

References Cited in the file of this patent

UNITED STATES PATENTS 2,714,310    Jennings  ---------------  Dec. 6, 1951